(12) United States Patent
Bordia

(10) Patent No.: US 7,921,171 B2
(45) Date of Patent: *Apr. 5, 2011

(54) SYSTEM FOR EXCLUDING RECIPIENTS IN AN ELECTRONIC COMMUNICATION SYSTEM

(75) Inventor: Aakash Bordia, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 220 days.

This patent is subject to a terminal disclaimer.

(21) Appl. No.: 12/254,045

(22) Filed: Oct. 20, 2008

(65) Prior Publication Data
US 2009/0043861 A1    Feb. 12, 2009

Related U.S. Application Data

(63) Continuation of application No. 10/726,047, filed on Dec. 2, 2003, now Pat. No. 7,457,841.

(51) Int. Cl.
*G06F 15/16* (2006.01)
(52) U.S. Cl. .......................................................... 709/206
(58) Field of Classification Search .................. 709/206
See application file for complete search history.

(56) References Cited

U.S. PATENT DOCUMENTS

| | | | | |
|---|---|---|---|---|
| 2003/0048298 | A1* | 3/2003 | Ellendman | 345/752 |
| 2003/0061289 | A1* | 3/2003 | Clissold et al. | 709/206 |
| 2004/0093382 | A1* | 5/2004 | Kulkarni | 709/206 |

* cited by examiner

*Primary Examiner* — Brandon S Hoffman
*Assistant Examiner* — William J Goodchild
(74) *Attorney, Agent, or Firm* — David A. Dagg

(57) ABSTRACT

A system that enables a communications system user to conveniently define entities to be excluded from receiving an electronic communication, such as an electronic mail ("email") message. An "Exclude" user entry field is provided in a user interface to a communication system. The Exclude field accepts entry of an "exclude set" of entities to be excluded from an email message being processed or defined in a currently accessible graphical user interface window. The disclosed Exclude field is provided in a user interface window together with one or more other user entry fields available for definition and/or review of an "include set" of entities initially designated for receipt of the message. Lists and/or groups may be resolved by determining the destinations they contain either within the client computer system, within a source server computer system, and/or within a destination server computer system.

12 Claims, 5 Drawing Sheets

SYSTEM FOR EXCLUDING RECIPIENTS IN AN ELECTRONIC COMMUNICATION SYSTEM

CROSS-REFERENCE TO RELATED APPLICATIONS

The present application is a Continuation under 35 U.S.C. 120 of commonly assigned prior U.S. application Ser. No. 10/726,047, filed Dec. 2, 2003 now U.S. Pat. No. 7,457,841 in the name of Aakash Bordia, now allowed.

FIELD OF THE INVENTION

The present invention relates generally to electronic communication systems, and more specifically to a system for excluding recipients in an electronic communication system using an exclude operation.

BACKGROUND OF THE INVENTION

Today's electronic communication systems are heavily relied on to support a wide variety of user needs. In particular, electronic mail software programs ("email") have become ubiquitous, and are often the most practical and/or efficient mode of communication available. However, user accessible controls over entities designated for receipt of an outgoing message are limited in typical systems. The entities processed in such systems may be mailing and distribution lists, user-defined groups, individual email addresses, aliases, or other specific types of recipient identifiers as appropriate for the specific communication system. Accordingly, in the present application, lists, groups, aliases and recipients are interchangeably referred to as entities.

For example, a user of existing email client-server software, such as Lotus Notes®, Microsoft Outlook Express®, Eudora®, or Sendmail™, does not have the ability to easily exclude an entity from an ongoing or initial communication, when using mailing lists, groups, and/or individual addresses. For example, an email program user may desire to send an email message to recipients listed in association with an email alias or a mailing list for a set of users, such as "Sales Employees", while excluding one or more entities within the list from receiving the message. Existing systems provide no convenient mechanism for accomplishing this objective. As a result, the user may be forced to individually input all the entities from the list other than the one(s) they wish to exclude into the destination field for the message. Similarly, if it is desired to exclude an entity from receiving an initial message or ongoing email thread, the current approach is to manually search and delete the unwanted recipient address or lists from destination fields. This shortcoming prevents the convenient use of the "Reply All" function in situations where one or more entities participating in a communication thread are intended to be excluded from a message within the ongoing series of communications.

This problem becomes more difficult in the case of a message in which the only receiving entities specified are specified as lists or groups. First, there is no convenient way to determine the individual email recipients of the message, without some automated way to resolve the component entities of each destination list on the client system. Existing systems do not operate to determine the individual addresses specified by each destination list or group, unless the list or group is local to the client. Moreover, even if the all destination lists and/or groups are fully resolved, the user of the client system must then manually search and delete those entities desired to be excluded from receiving the message.

In the area of bulk email software, sometimes referred to as "spamming" tools, some recipient exclusion capabilities exist. Existing bulk email tools provide the ability to define a recipient exclusion file separate from and outside the user interface for defining, addressing and sending a specific message. Accordingly, such list definition tools are not suitable for general email users, since the exclusion step, even for a single message, requires list manipulation independent from the steps of defining and/or responding to a message. Switching to another window within the user interface window to perform such list editing and/or definition is undesirable from a usability perspective. Moreover, separate list editing steps may be cumbersome when defining and/or responding to individual messages, such as within a message thread using a "Reply All" function. Editing an exclusion file for a small number of desired exclusions is, like manually searching and editing the contents of message destination fields to delete individual recipients, time consuming and inefficient. Thus, while existing bulk email tools are useful for batch processing of "spam" email messages, their overall design and user interfaces leave much to be desired for the general email user.

For the above reasons, it would be desirable to have a new system for controlling the recipients of an electronic message, such as an email message. The system should allow a user to exclude recipients as easily as it allows the user include recipients of a message.

SUMMARY OF THE INVENTION

To address the problems described above and others, a system is disclosed that enables a communications system user to conveniently define entities to be excluded from receiving an electronic communication, such as an electronic mail ("email") message. In an illustrative embodiment, the disclosed system provides an "Exclude" user entry field in a user interface to an email system. The Exclude field accepts entry of an "exclude set" of entities to be excluded from being recipients of an email message being processed or defined in a currently accessible graphical user interface window. The disclosed Exclude field is provided in a user interface window together with one or more other user entry fields available for definition and/or review of an "include set" of entities initially designated for receipt of the message.

The user entry fields available for definition and/or review of an "include set" may, for example, include a cc: ("carbon copy") user entry field, a bcc: ("blind carbon copy") user entry field, as well as the To: user entry field. The bcc: user entry field lists addresses, groups, or lists, to which the message will be sent, but which will not be seen by the recipients, while the contents of the cc: field will be visible to all recipients.

The disclosed system is applicable to a variety of communication systems, such as email and other similar methods of communication. The entities processed using the disclosed system may be mailing and distribution lists, user-defined groups, individual email addresses, aliases, or other specific types of recipient identifiers as appropriate to a specific communication system. In some cases, multiple recipients are addressed by a single recipient identifier, like an email address. The specific title or image identifying the Exclude field may include a text title of "Exclude", or provide any other textual or graphic indication of the field, as appropriate. The Exclude field may be adjacent to the fields defining the include set, or in some other location within the user interface window. The disclosed system processes one or more entities identifiers entered by a user into the Exclude field by preventing those entities from receiving the email/communication. Accordingly, the disclosed system may be used to exclude an individual within a group or list from receiving a message, or to exclude irrelevant users from receiving a message otherwise received by all recipients in an ongoing email thread in which recipients are replying to all users within a group using a "Reply All" email function. The disclosed system can be used to exclude any specified set of entities from the set of recipients.

The disclosed system provides significant advantages over the prior art. Specifically, the disclosed system enables a user to exclude recipients from an ongoing discussion using email, as easily as the user can add recipients to the ongoing discussion. The disclosed system may further operate to process email groups and/or lists by resolving their contents on either the client or server side. Moreover, in contrast to bulk email systems designed to send large numbers of copies of a single email message, the present invention automates the exclusion of entities from individual messages in a way that is useful to the general email user. For many users, this will translate into a) saving keystrokes, and b) eliminating the trouble of remembering all the entities on a list or in a group. The disclosed system also potentially reduces network traffic and disk space usage, since the amount of overall traffic is reduced through its use.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
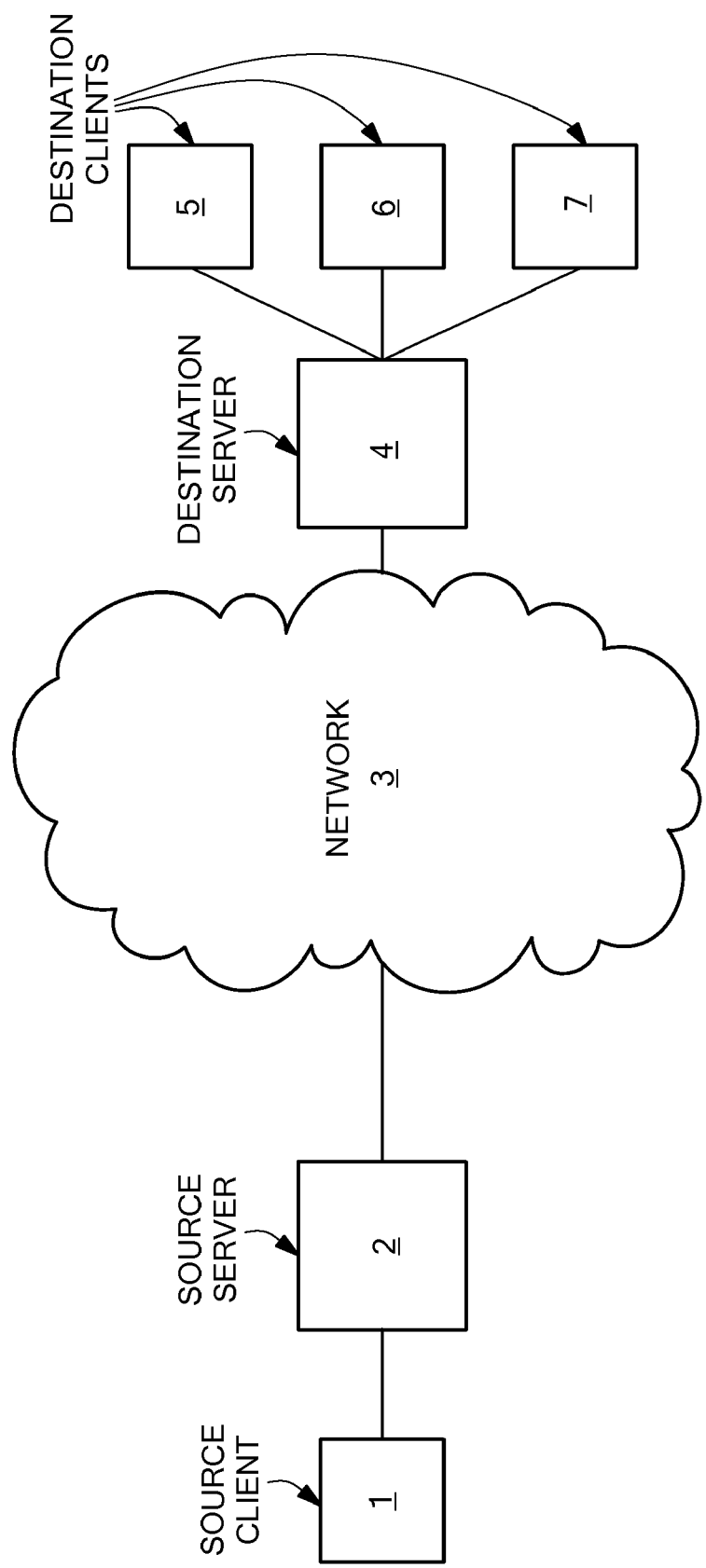
FIG. 1 is a block diagram illustrating devices in an embodiment of the disclosed system.

As shown in FIG. 1, devices in an illustrative embodiment of the disclosed system include a source client system 1 communicably coupled to a source server system 2. The source server system 2 is communicably coupled to a network 3, over which it communicates with a number of destination server systems, shown for purposes of illustration as destination server system 4. The destination server system 4 is communicably coupled with some number of destination client systems, shown as destination client systems 5, 6 and 7.

The source client system 1, source server system 2, destination server system 4, and destination client systems 5, 6 and 7 are, for example, each computer systems having one or more processors, as well as associated memory for storing program code executable on such processors. Such computer system may be based on any appropriate any specific computer architecture and/or operating system, and the program code may be provided to the processor and/or stored in the associated memory using any appropriate programming language and/or data format. For purposes of explanation, the source client 1 and destination clients 5, 6 and 7 each execute electronic mail ("email") client programs. The source server 2 executes an email server program associated with the email client program in the source client 1, while the destination server 4 executes an email server program associated with the email client programs in the destination clients 5, 6 and 7.

Figure 2:
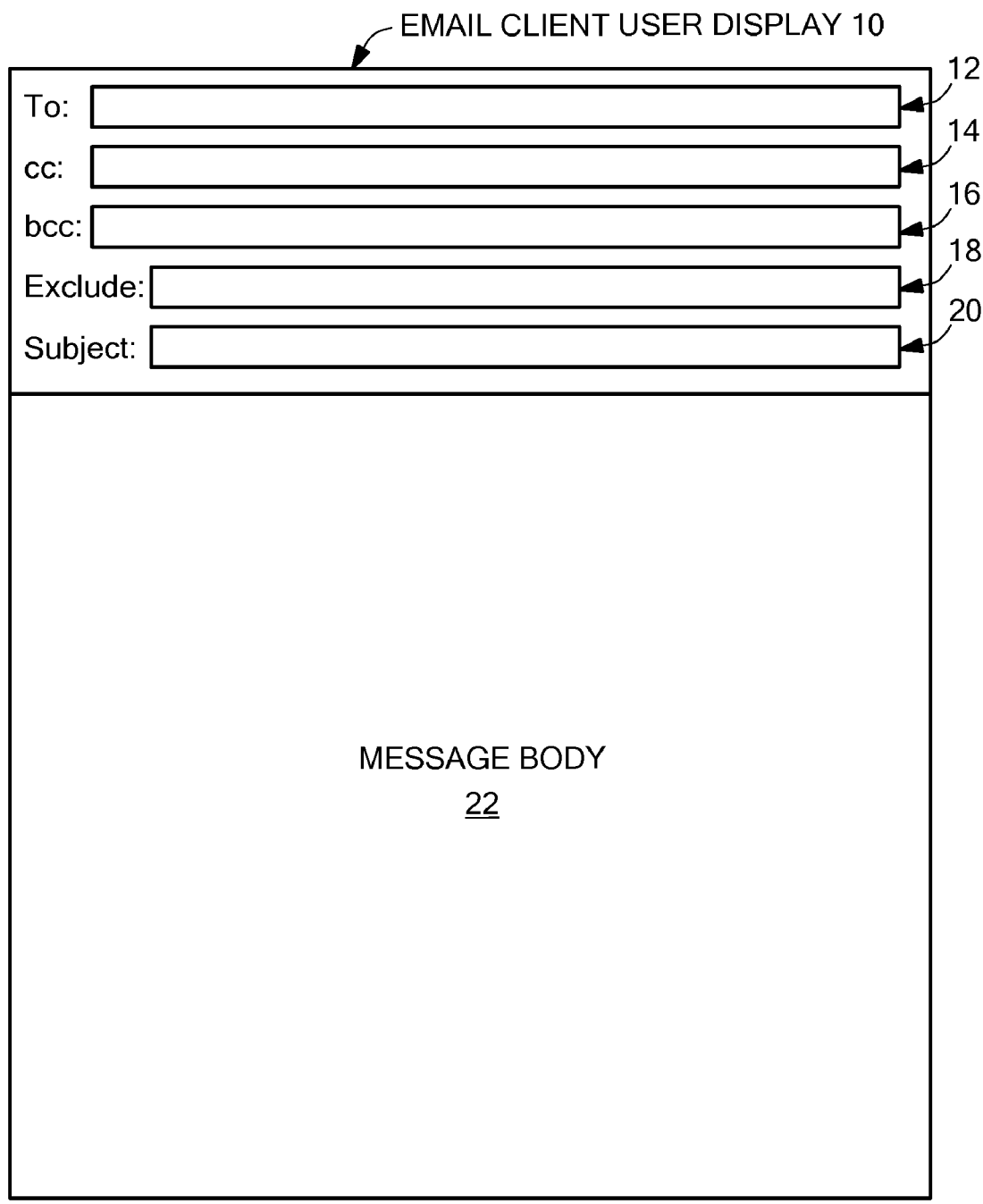
FIG. 2 is a block diagram representation of a screen display showing a client email user interface for an embodiment of the disclosed system.

As shown in FIG. 2, an embodiment of the disclosed system operates to provide a graphical user interface (GUI) display including a message processing display object or window, such as the electronic mail ("email") client program user display 10. The email client user display 10 is displayed, for example, to a user of client software in an email client-server software system, such as a user of the source client system 1 of FIG. 1. In the embodiment of FIG. 2, the client user display 10 is provided within a single window of a window based user interface, such as that may be provided by a window manager program in a windowing system within an operating system executing on the client computer system. The window containing the client user display 10 may, for example, be provided as a separate viewing area on a computer display screen in a system that allows multiple viewing areas as part of the graphical user interface (GUI).

As shown in the illustrative embodiment of FIG. 2, the client user display 10 is generated including a destination user entry field, shown as the To: user entry field 12, a carbon copy user entry field, shown as the cc: user entry field 14, a blind carbon copy field, shown as the bcc: user entry field 16, an exclude user entry field, shown as the Exclude: user entry field 18, a subject line user entry field, shown as the Subject: user entry field 20, and a message definition portion, shown as the message 22 in FIG. 2.

Figure 3:
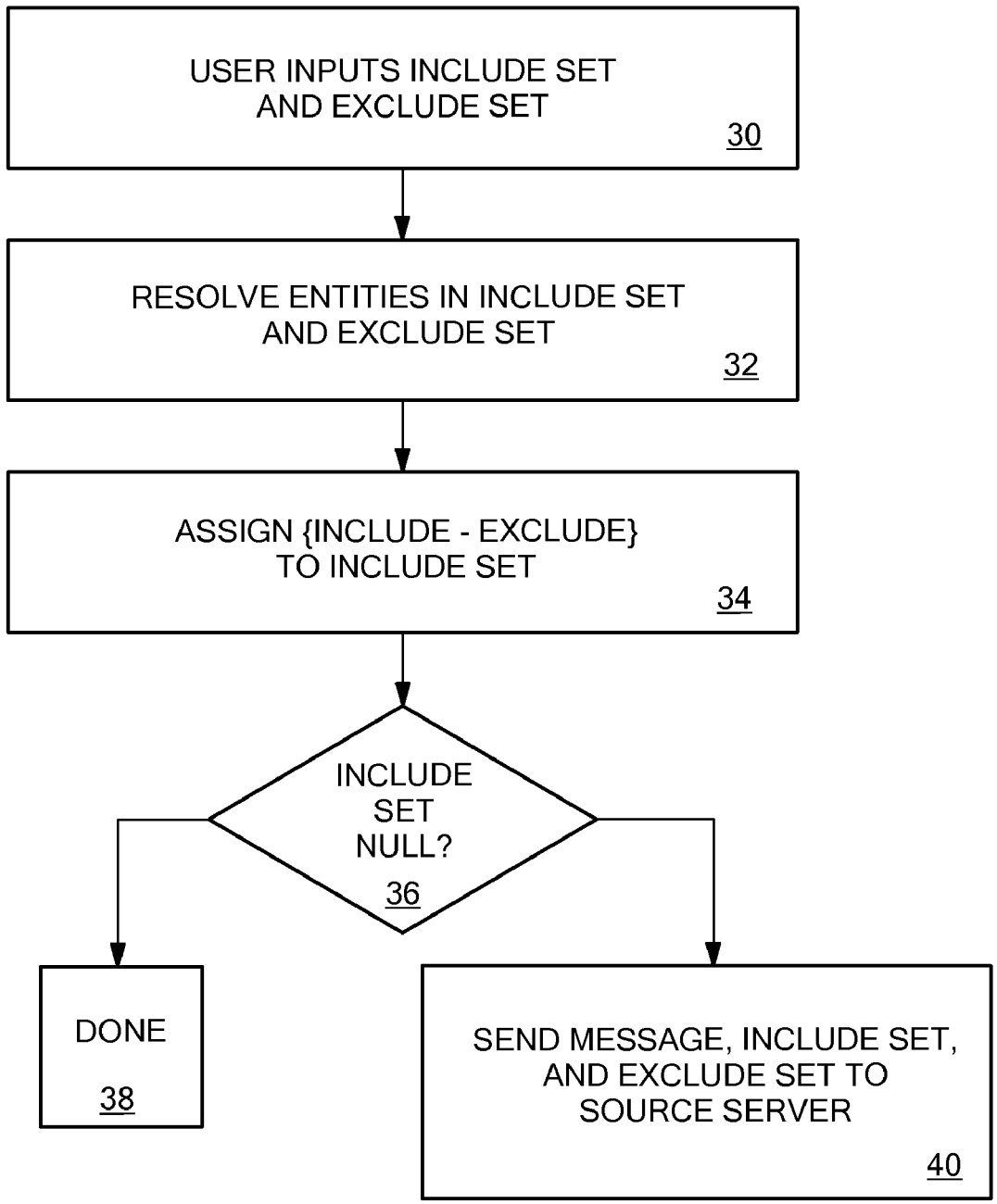
FIG. 3 is a flow chart illustrating operation of a source client computer system an embodiment of the disclosed system.

FIG. 3 is a flow chart showing steps performed at a source client system, such as the source client system 1 of FIG. 1. As shown in FIG. 3, at step 30 the source client accepts the include set and exclude set as inputs from the user, for example through an interface such as shown in FIG. 2. For example, the include set consists of the entities present in the destination, carbon copy, and blind carbon copy user entry fields 12, 14, and 16 of FIG. 2. The contents of the destination, carbon copy, and blind copy fields may be explicitly entered by the user in the current display window, or may be preloaded as a result of the user using a Reply or Reply all function or other client configuration with regard to a previously received message through the email client program interface. The exclude set consists of the entities present in the exclude user entry field, such as the Exclude: user entry field 18 of FIG. 2. The contents of the exclude field may also be explicitly entered by the user in the current display window, or may be preloaded as a result of the user using a Reply or Reply all function with regard to a previously received message through the email client program interface. The entities within the include set and the exclude set may consist of individual user addresses, address lists, user-defined groups, user-defined aliases, or other indications of potential recipients of the current message.

At step 32, the source client system resolves any unresolved entities in the include set or exclude set that it can resolve, either locally based on information stored in the source client system, or by contacting a remote entities processing facility. For example, a remote entities processing facility employed at step 32 could consist of an email server software executing on the source server 2 of FIG. 1, or a directory server, or some other facility. In the exemplary embodiment, resolution of entities in the include set or exclude set means, for example, that identifiers in the sets are translated into one or more email addresses, each of which having a destination server IP (Internet Protocol) address associated with them. Step 32 may include determining which entities within the include and exclude sets indicate multiple recipients, as in the case of a distribution list or user defined group. For such entities, the source client system attempts to determine the individual recipient identifiers, such as email addresses, associated with them. After the entity resolution performed at step 32, there are, for example, entities in both the include set and the exclude set, which may be either resolved or unresolved.

At step 34, the include set is now assigned the difference between the include set and the exclude set. The exclude set remains the original exclude set. Accordingly, at step 34, the following set theory difference operation is performed:

INCLUDE SET={INCLUDE SET−EXCLUDE SET}

As a result, the include set contains all members of the include set that do not belong to the exclude set. As will be apparent to those skilled in the art, the include set cannot be empty initially, while the exclude set can be empty.

At step 36, the disclosed system determines whether the include set resulting from step 34 is empty. If so, then the flow ends at step 38. Otherwise, the new include set, exclude set, and message are sent to a source server, such as the source server system 2 of FIG. 1, for further processing.

Figure 4:
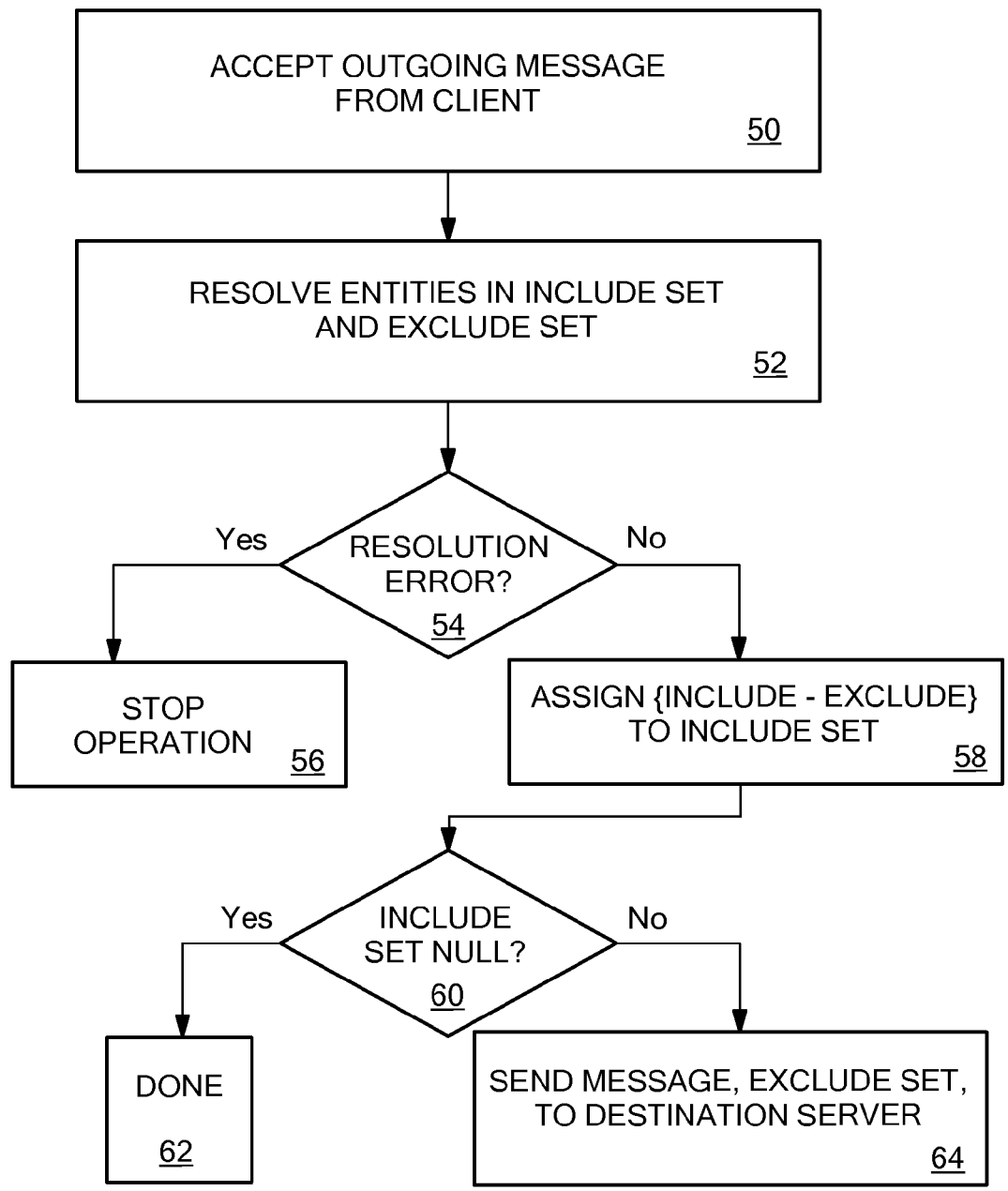
FIG. 4 is a flow chart illustrating operation of a source server in an embodiment of the disclosed system.

FIG. 4 is a flow chart showing steps performed by a source server system, such as the source server system 2 of FIG. 1, in an embodiment of the disclosed system. As shown in FIG. 4, email server software executing on the source server system accepts the message transmitted from the source client system, as described at step 40 of FIG. 3, together with the include and exclude sets. At step 52, the source server system operates to resolve the include set and the exclude set, by resolving any unresolved entities in the include set or exclude set that it can resolve. At step 54, the source server system may operate to determine whether a resolution error has occurred. A resolution error occurs when the source server is unable to resolve all the entities in the include and exclude sets it received to their respective destination IP addresses. If such an error occurs, then step 54 is followed by step 56, in which an error may be sent back to the source client system stating that one or more entities could not be resolved, and processing of the message may be terminated. Otherwise, step 54 is followed by step 58, at which the source server system assigns the difference between the include set and the exclude set to the include set. The exclude set remains unchanged. If the resulting include set is determined to be empty at step 60, then processing is completed at step 62. Otherwise, step 60 is followed by step 64, in which the disclosed system operates to send the message to the entities in the new include set, and also passes along the exclude set with each message. Those skilled in the art will recognize that the forwarded message implicitly includes the relevant include set for any given destination server, for example, a message sent to user1@ibm.com, user2@ibm.com and user3@xyz.com will implicitly include {user1,user2} as the include set for destination server ibm.com, and {user3} as the include set for destination server xyz.com.

Figure 5:
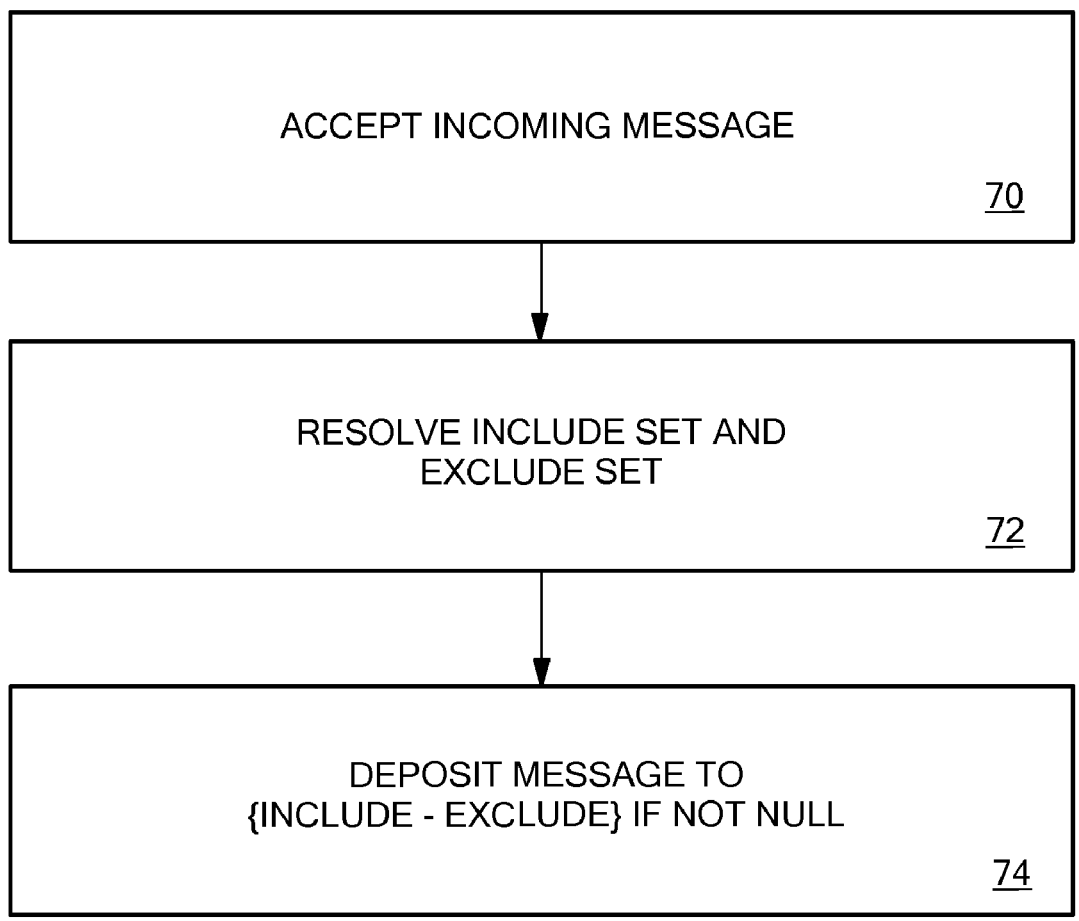
FIG. 5 is a flow chart illustrating operation of a destination server in an embodiment of the disclosed system.

FIG. 5 is a flow chart showing steps performed by an embodiment of the disclosed system to process information received by a destination server system, such as the destination server 4 of FIG. 1. The destination server may or may not support exclusion of recipients, and the disclosed system can operate whether or not such exclusion is supported on the destination server. At step 70, the destination server accepts the incoming message from the source server, which may include the exclude set. At step 72, the destination server may operate to resolve one or more entities within the exclude set and include list that it received with the message from the source server. At step 74, in the event that a difference operation on the include set and exclude set has a non-null result, the destination server deposits the received message to the set of entities indicated by the difference between the include set and the exclude set, for example by transmitting the message to one or more destination clients such as the destination client systems 5, 6 and 7 shown in FIG. 1. The destination server may operate as a source server system for messages sent to other destination server systems, for example for messages originating the destination client systems communicably coupled with the destination server system. Also, the destination server may operate as a source server for messages received from other source server systems, for example for entities in an incoming message's include set resolves into one or more recipients which are not within the domain of the destination server. In such a case the source server functions as a virtual source client of the destination server.

In an example of operation of the disclosed system, a distribution list may be defined as the ALL-Employees list, and contain 2000 individual user entities, each consisting of an individual email address. A user may desire to send an email message to those users within the All-Employees list, but to exclude a particular user, identified an individual email address John-Smith@company. The user needs to simply enter the All-Employees list identifier into the To: user entry field 12 of FIG. 2, and also enter the email address John-Smith@company into the Exclude: user entry field 18, and then click on a "send" button provided by the email client software. Similarly, if the user desires to send a message to the All-Employees list, but to exclude 80 users listed in a list identified as the Federated-Team list, the user needs simply to enter the All-Employees list identifier into the To: user entry field 12 of FIG. 2, and also enter the Federated-Team list identifier into the Exclude: user entry field 18, prior to clicking on a "send" button provided by the email client software. Moreover, if, during a message thread being communicated among all users listed within the All-Employee list, the user receives a message, and wishes to send a reply excluding the users within the Federated-Team list. The user need only use a Reply or Reply all function, and then enter the Federated-Team list identifier into the Exclude: user entry field 18, prior to clicking on the "Send" button provided by the email client software.

FIGS. 3, 4 and 5 are flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that the system may be embodied using a variety of specific command structures. Accordingly, the invention should not be viewed as limited except by the scope and spirit of the appended claims.

I claim:

1. A system comprising:
   at least one processor and a computer readable storage medium, said computer readable storage medium having program code stored thereon for, when executed by said processor, processing a message for transmission, said program code comprising:
   program code for determining an include set of recipient entities, wherein said determining said include set of recipient entities includes displaying at least one destination user input field within a graphical user interface window and inputting said include set of recipient entities from said at least one destination user input field;
   program code for determining an exclude set of recipient entities, wherein said determining said exclude set of recipient entities includes displaying at least one exclude user input field within said graphical user interface window and inputting said exclude set of recipient entities from said at least one exclude user input field;
   program code for assigning, by a source server system, a difference between said include set of recipient entities and said exclude set of recipient entities to a new include set of recipient entities;
   program code for transmitting said new include set of recipient entities and said exclude set of recipient entities to a destination server system;
   program code for determining, by said destination server system, a result of a difference operation between said new include set of recipient entities and said exclude set of recipient entities; and
   program code for sending, by said destination server system, said message to destinations indicated by those recipient entities within said result of said difference operation between said new include set of recipient entities and said exclude set of recipient entities.

2. The system of claim 1, wherein one of said recipient entities in said include set of recipient entities comprises a list identifier, and wherein said program code further comprises:
   program code for resolving said list identifier in said source server system, wherein said resolving includes determining at least one individual address associated with said list identifier.

3. The system of claim 2, wherein at least one of said recipient entities in said exclude set of recipient entities comprises a second list identifier, and wherein said program code further comprises:
   program code for resolving said second list identifier at said destination server system, wherein said resolving includes determining at least one individual address associated with said second list identifier.

4. The system of claim 3, wherein a second one of said recipient entities in said include set of recipient entities comprises a third list identifier, and wherein said program code further comprises:
   program code for resolving said third list identifier at said destination server system, wherein said resolving includes determining at least one individual address associated with said third list identifier.

5. The system of claim 1, wherein said program code for determining said include set of recipient entities further comprises program code for displaying at least one carbon copy user input field within said graphical user interface window and program code for inputting at least one of said include set of recipient entities from said at least one carbon copy user input field.

6. The system of claim 5, wherein said program code for determining said include set of recipient entities further comprises program code for displaying at least one blind carbon copy user input field within said graphical user interface window and program code for inputting at least one of said include set of recipient entities from said at least one blind carbon copy user input field.

7. A computer program product, comprising:
   a non-signal computer readable storage medium, said computer readable storage medium having program code stored thereon for processing a message for transmission, said program code comprising:
   program code for determining an include set of recipient entities, wherein said determining said include set of recipient entities includes displaying at least one destination user input field within a graphical user interface window and inputting said include set of recipient entities from said at least one destination user input field;
   program code for determining an exclude set of recipient entities, wherein said determining said exclude set of recipient entities includes displaying at least one exclude user input field within said graphical user interface window and inputting said exclude set of recipient entities from said at least one exclude user input field;
   program code for assigning, by a source server system, a difference between said include set of recipient entities and said exclude set of recipient entities to a new include set of recipient entities;
   program code for transmitting said new include set of recipient entities and said exclude set of recipient entities to a destination server system;
   program code for determining, by said destination server system, a result of a difference operation between said new include set of recipient entities and said exclude set of recipient entities; and
   program code for sending, by said destination server system, said message to destinations indicated by those recipient entities within said result of said difference operation between said new include set of recipient entities and said exclude set of recipient entities.

8. The computer program product of claim 7, wherein one of said recipient entities in said include set of recipient entities comprises a list identifier, and wherein said program code further comprises:

program code for resolving said list identifier in said source server system, wherein said resolving includes determining at least one individual address associated with said list identifier.

9. The computer program product of claim 8, wherein at least one of said recipient entities in said exclude set of recipient entities comprises a second list identifier, and wherein said program code further comprises:

program code for resolving said second list identifier at said destination server system, wherein said resolving includes determining at least one individual address associated with said second list identifier.

10. The computer program product of claim 9, wherein a second one of said recipient entities in said include set of recipient entities comprises a third list identifier, and wherein said program code further comprises:

program code for resolving said third list identifier at said destination server system, wherein said resolving includes determining at least one individual address associated with said third list identifier.

11. The computer program product of claim 7, wherein said program code for determining said include set of recipient entities further comprises program code for displaying at least one carbon copy user input field within said graphical user interface window and program code for inputting at least one of said include set of recipient entities from said at least one carbon copy user input field.

12. The computer program product of claim 11, wherein said program code for determining said include set of recipient entities further comprises program code for displaying at least one blind carbon copy user input field within said graphical user interface window and program code for inputting at least one of said include set of recipient entities from said at least one blind carbon copy user input field.

* * * * *